United States Patent
Hessling

[11] 3,881,610
[45] May 6, 1975

[54] LOADING APPARATUS OR LOADING HEAD FOR LOOSE MATERIAL

[76] Inventor: Heinz Wilhelm Hessling, Oststr. 41, 472 Beckum, Germany

[22] Filed: May 8, 1973

[21] Appl. No.: 358,409

[30] Foreign Application Priority Data
May 16, 1972 Germany ............................ 7218354

[52] U.S. Cl. .................. 214/17 B; 214/17 C; 55/68
[51] Int. Cl. ............................................. A01f 25/00
[58] Field of Search ........... 214/17 B, 17 C; 141/93; 55/68

[56] References Cited
UNITED STATES PATENTS
3,011,662  12/1961  Daily ............................. 214/17 CA

*Primary Examiner*—Robert J. Spar
*Assistant Examiner*—R. B. Johnson
*Attorney, Agent, or Firm*—Fitch, Even, Tabin & Luedeka

[57] ABSTRACT

A loading head apparatus for the charging of a reservoir or silo with loose material having dust or other airborne fines associated therewith includes a vertically adjustable discharge tube through which the loose material may be discharged to the reservoir or silo. The airborne dust is recovered and collected within the loading head apparatus by inducing air flow through a concentric container about the tube to pull therein the airborne dust which is carried upwardly to a plurality of filter elements. A fan draws the air into and through the filter elements which filter the dust and collect the same. A vibrator shakes the filter elements to cause the dust to drop therefrom. A vertically movable cone is positioned beneath the variable length tube and is used to lift the lower end of the tube and to collapse a bellows portion of the container.

8 Claims, 4 Drawing Figures

LOADING APPARATUS OR LOADING HEAD FOR LOOSE MATERIAL

The present invention relates to a loading apparatus or loading head for the charging of reservoirs or silos with loose material while preventing the escape of dust, comprising a loading cone being vertically adjustable on a tube or guiding means of variable length, which loading cone is joined by a bellows enclosing said tube and through which air loaded with dust from the loose material is sucked off adjacent said tube.

There are known loading heads of the abovementioned type wherein the loose material is supplied through a conveyor chute or by a screw conveyor and wherein dust collection and suction means are provided remote from the loading head, which means are connected to the loading head via pressure conduits. However, it has been found to be disadvantageous in these constructions that the recovering of the separated dust is troublesome, that the apparatus as such is of complicated construction and operation, and that, on the whole, the function of the loading head is not always satisfactory.

In comparison herewith, it is the object of the present invention to provide a loading head or a loading apparatus which in most easy manner may be positioned for the loading of reservoirs and mobile silos of any type, which is of particularly simple construction and may be produced in particularly economical manner, which completely prevents the generation of dust during the loading operation, and wherein, in particular, the recovery of the dust from the dust collection device can be effected in most simple manner.

Further, the loading head according to the invention should render possible the loading with loose or bulk materials of most various type, and even materials of low bulk weights, and it should be capable of precisely indicating the desired degree of filling of the reservoir or silo to be charged. Another requirement for the loading head according to the invention is easy handling and easy adjustability.

In a loading head of the above-indicated kind, this object is solved in accordance with the invention in that said dust collection and/or suction device is positioned above the loading cone within said loading head.

Advantageously, and in order to provide a compact construction, the dust collection and/or suction device may be positioned within a container which joins the bellows, whereby the length-variable tube and the container may be disposed in concentric relation to each other, while a number of filter elements is mounted to the periphery of the container.

In order to permit easy recovery of the dust collected from the dust-loaded suction air, the bottom of the container which closes the lower end of the dust chamber, may converge conically to join the bellows, and the container, in turn, may carry on a pipe section a fan or blower for conveying air from the interior of the container, namely of the clean gas chamber.

In another embodiment of the invention, a vibrating means transmits its vibrating force to supporting beams for the filter elements (filter tubes) in order to provide for a cleaning of the filter elements from the dust.

Furthermore, in order to determine the desired filling level interiorly of the reservoir or silo to be filled, a cone may be arranged under the lower end of the length-variable tube, which cone may be lifted by means of drawing means to thereby raise the lower portion of the tube of variable length and the loading cone, and which cone has at/or below its horizontally extending base surface elements for indicating the presence of loose material thereat which occurs when a sufficient degree of filling is reached.

For loose materials especially having a high bulk weight, the horizontal base surface of the cone may have disposed thereon a source of radiation, preferably for γ-radiation, while a corresponding receiver for the radiation is positioned with a certain spacing from the radiation source so as to deliver a signal for the termination of the loading operation through, not illustrated, known per se devices.

In the following, an exemplary embodiment of the loading head according to the invention is described in greater detail by referring to the drawings, wherein.

Figure 1:
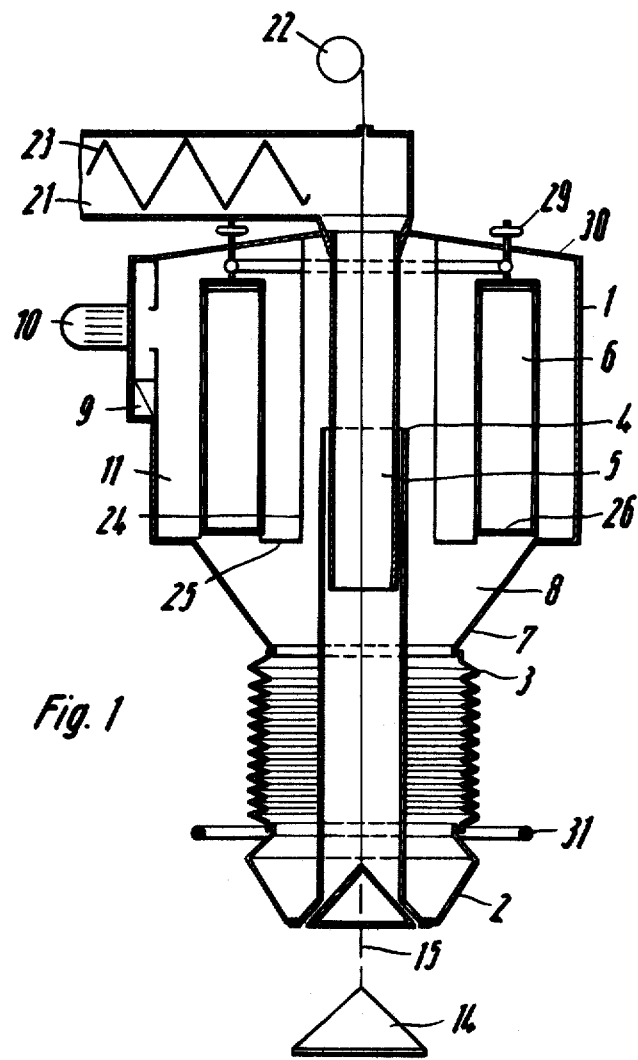
FIG. 1 is a schematical sectional view through a loading head according to the invention with the material to be conveyed being fed by means of a screw conveyor, whereby the section is taken in a vertical plane.
Figure 2:
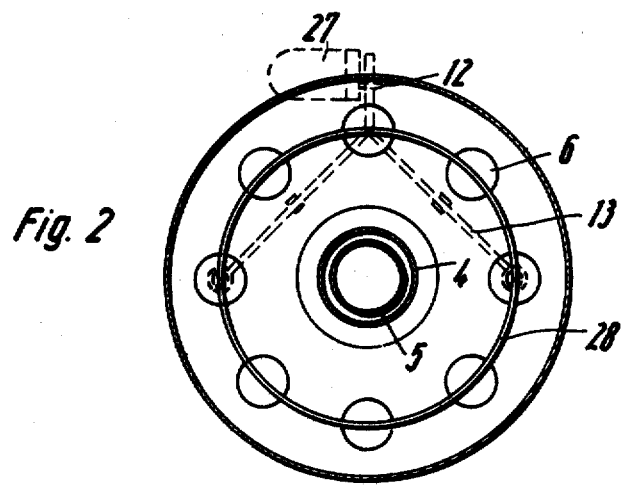
FIG. 2 shows a section through a loading head according to FIG. 1 in a horizontal plane.

As shown in the Figures, the loading head or the loading apparatus according to the invention comprises principally a container 1 for the dust collection and suction device, which container is joined through a conical container bottom 7 to a bellows 3 having a loading cone 2 positioned therebelow.

Interiorly of the container 1, there is provided a tube 4, 5 of variable length which tube has either the form of, as illustrated in the Figures, a telescoping tube comprising an upper tube 4 and a lower tube 5 adapted to be moved upwardly and downwardly within the upper tube, or the form of a bellows or the like. The lower end 5 of the tube is connected to the loading cone 2 in such a manner that air containing dust may flow through the cone 2 adjacent the tube and upwardly, through the container 1 and upwardly through the bellows 3 into filter elements.

A drawing means, e.g. a rope or cable is passed through the tube 4, 5 which cable at its upper end may either be wound up by a winch or which is passed around a redirection pulley 22 whereby the winch, in such case, is arranged outside of the loading head. The lower end of the cable 15 has secured thereto a cone 14 which is adapted to fit into the free opening of the loading cone.

When the cone 14 is lowered, the air may flow along this cone through the loading cone 2 into the container 1, and by means of the tube 4, 5 of variable length the loose material may be poured into a reservoir or a corresponding silo to be moved underneath the loading cone.

When the drawing means or cable is pulled up, the cone 14 enters the loading cone 2 and thereby lifts the lower end 5 of the tube while contracting the bellows 3, so that the reservoir may be moved away from underneath the loading head and a new reservoir may be moved into the position to be loaded.

Figure 3:
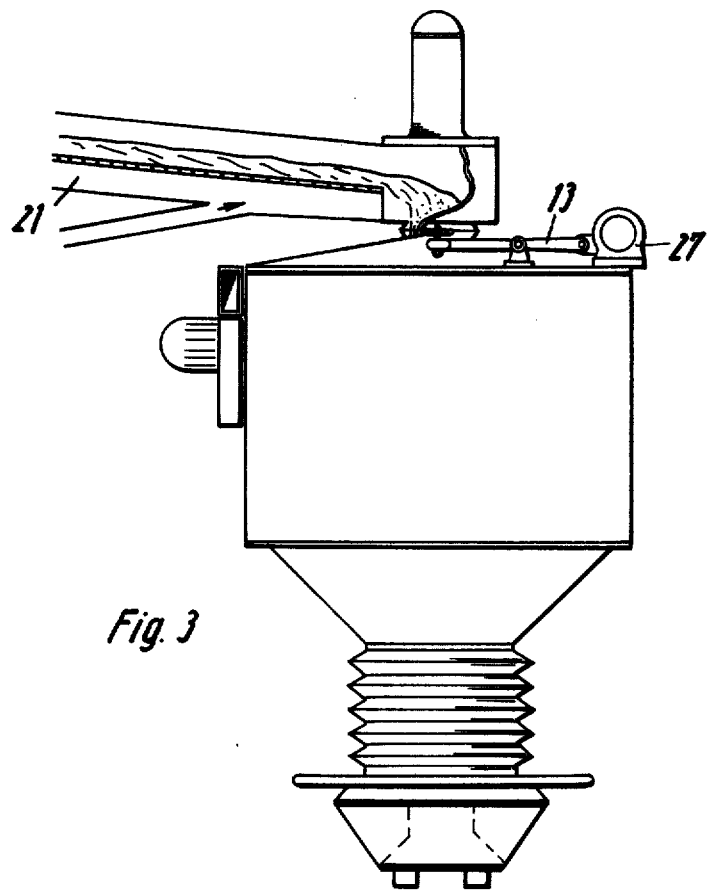
FIG. 3 is a side elevational view of a loading head according to the invention including a pneumatic conveyor chute shown in sectional view.
Figure 4:
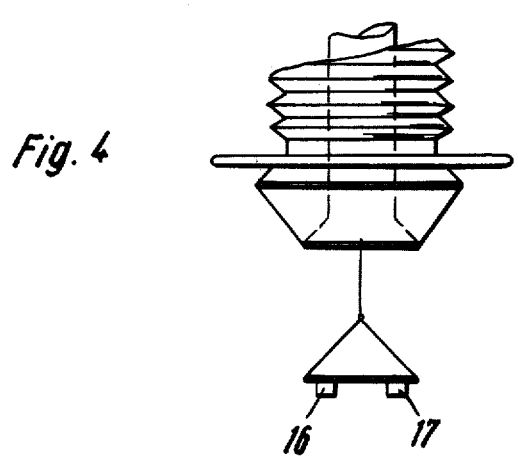
FIG. 4 is a schematical view of the loading head of the embodiment according to FIG. 3.

The upper inlet end 4 of the tube opens into a conveyor chute 21 which may be formed e.g. as a pneumatic conveyor chute 21 having a bottom through which air flows (FIG. 3), or which may be designed as a conveyor chute 21 having a rotatable screw conveyor 23 (FIG. 1) therein.

Interiorly of the container 1, a cylindrical wall 24 is disposed in concentric relation to the longitudinally movable tube 4, 5 and extends to a partition 25. The partition is positioned at the upper end of the conical container bottom 7 and includes a plurality of bores 26 arranged in concentric relation to the cylinder 24 and to which the lower ends of the filter elements 6 are sealingly connected.

The inner space within the filter elements 6, the inner space of the cylinder 24 and the space below the partition 25 form a dust chamber 8, while a clean gas chamber 11 is formed above the partition 25 outside of the filter elements 6.

Thus, the airborne dust flows upwardly from the loading cone, through the bellows 3, the bores 26 into the interior of the filter elements 6. The air flows through the filter elements into the clean gas chamber 11 with dust collecting on the interior sides of the filter elements.

A connecting piece 9 is attached to the periphery of the container 1 which connecting piece has disposed therein a fan 10 which sucks off the air from the clean gas chamber 11.

The upper ends of the filter elements 6 are closed and attached to a generally γ-shaped supporting beam 13 (FIG. 3) which, by means of a vibrating device 12 and through another motor 27, permits to continuously or intermittently vibrate the apparatus in order to detach the dust deposited within the filter elements 6.

Herein, the upper ends of the filter elements 6 are secured to a ring 28, and the connection between the ring 28 and the supporting beam 13 is effected by means of a pair of vertically extending hanger irons 29 having lower ends connected to the ring 28 and upper ends connected to the ends of the Y shaped beam 13. The hanger irons 29 slidingly pass through the cover 30 of the container 1 in substantially sealed fashion.

The supporting beam 13 which is of γ-shaped configuration in order to facilitate the suspension of the ring 28, is supported on the cover 30 in a pair of not separately illustrated abutments, such that the motion produced by the vibrating motor 27 is transmitted through the hanger irons 29 to the ring 28 and to the filter elements suspended thereon in order to beat the deposits off from the filter elements. The dust deposits fall downwardly into the dust chamber 8 toward the conical section and will recirculate if very light and the fan 10 is in operation; otherwise the deposits may fall from the cone 2 into the ambient atmosphere. That is, the loading head according to the invention is capable of sucking off the air introduced with the loose material during the loading operation and the air being displaced within the filled reservoir and carrying dust. The dust is retained in the filter elements 6 and, upon being knocked loose, drops back into the container 1 and through its conical bottom 7 in opposition to the flow of the sucked in air.

A hand ring or rail 31 enables the operators to safely and readily place the loading head including the cone 2 onto the opening of the reservoir to be filled, whereby the filling operation is then performed with the complete exclusion of any escape of dust provided that a sealing means is provided between the reservoir to be filled and the loading cone.

In view of the fact that the loading head according to the invention is easy to handle and of compact construction, it may be swung into any desired position over the reservoir to be filled by not illustrated means, because the feed means 21 for the loose material can be adjusted in its position and length in a manner known per se.

In order to verify whether the reservoir has been filled up to the desired level, the cone 14 below the loading cone 2 has attached thereto elements for signaling when the filling operation has been completed.

In such case, especially if loose materials having high bulk weights, such as e.g. cement, are loaded, a radiation source 16 for γ-radiation and an associated receiver 17 spaced from the source may be provided.

Now, when the filling level of the loose material raises to such extent that it reaches the lower limit of the cone and enters into the space between the radiation source 16 and the receiver 17, the radiation received by the receiver is weakened, and a conventional measuring device may provide a signal so as to draw the operators' attention to the filling level.

What is claimed is:

1. A loading head apparatus for charging loose material having dust or fine material associated therewith comprising
   a vertically extending tube means of adjustable length having an upper inlet end for receiving the loose material and lower discharge end for discharging the loose material,
   container means about said tube means providing an air flow path for air and airborne dust therethrough and adjustable with said tube means,
   means on said head apparatus for creating a suction to cause air and the airborne dust to flow through said container means
   and a dust collection means within said head apparatus for separating the dust from the air and for collecting the dust.

2. A loading head apparatus according to claim 1 in which said container means comprises a bellows section which is expandable and contractable with a change in length of said tube.

3. An apparatus in accordance with claim 1 in which said dust collection means comprises a plurality of filter elements in said loading head apparatus for filtering the dust from the air flow therethrough.

4. A loading apparatus according to claim 2 in which said container means has a lower end converging conically to and joined to said bellows.

5. A loading head apparatus in accordance with claim 2 in which said suction creating means comprises a fan for exhausting air out of the interior space of said container means and said collection means to the ambient atmosphere.

6. A loading head apparatus in accordance with claim 3 in which a vibrating means is connected to said filter element to vibrate the same to shake the collected dust therefrom.

7. A loading head apparatus according to claim 1 in which a cone means is disposed at the bottom of said variable length tube means and in which means are provided for lifting the lower end of the cone to raise the lower end of said tube means.

8. A loading head apparatus in accordance with claim 1 in which a cone means is positioned under the lower end of said variable length tube means and in which a radiation source is carried by said cone means and in which a corresponding receiver is carried by said cone means for receiving radiation from said radiation source.

* * * * *